(12) United States Patent
Kim et al.

(10) Patent No.: US 11,169,769 B2
(45) Date of Patent: Nov. 9, 2021

(54) ELECTRONIC DEVICE AND VOLUME ADJUSTMENT METHOD OF ELECTRONIC DEVICE

(71) Applicant: Samsung Electronics Co., Ltd., Suwon-si (KR)

(72) Inventors: Heejin Kim, Suwon-si (KR); Myoungwoo Nam, Suwon-si (KR); Ochae Kwon, Suwon-si (KR); Younghak Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/053,519

(22) PCT Filed: Jul. 12, 2019

(86) PCT No.: PCT/KR2019/008615
§ 371 (c)(1),
(2) Date: Nov. 6, 2020

(87) PCT Pub. No.: WO2020/013647
PCT Pub. Date: Jan. 16, 2020

(65) Prior Publication Data
US 2021/0240434 A1 Aug. 5, 2021

(30) Foreign Application Priority Data
Jul. 13, 2018 (KR) .......................... 10-2018-0081420

(51) Int. Cl.
*G06F 3/16* (2006.01)
*H04R 3/00* (2006.01)
*G06F 3/0484* (2013.01)

(52) U.S. Cl.
CPC .......... *G06F 3/165* (2013.01); *G06F 3/04847* (2013.01); *H04R 3/00* (2013.01); *H04R 2430/01* (2013.01)

(58) Field of Classification Search
CPC ............................ G06F 3/165; G06F 3/04847
See application file for complete search history.

(56) References Cited

U.S. PATENT DOCUMENTS 8,306,235 B2 11/2012 Mahowald
8,838,183 B2 9/2014 Zatloukal
(Continued)

FOREIGN PATENT DOCUMENTS

CN 106095379 A 11/2016
JP 2003-058198 A 2/2003
(Continued)

OTHER PUBLICATIONS

European Search Report dated May 14, 2021, in European Application No. 19835022.5.

*Primary Examiner* — David E Choi
(74) *Attorney, Agent, or Firm* — Jefferson IP Law, LLP

(57) ABSTRACT

Disclosed are an electronic device and a method of controlling a volume of an electronic device. A method of controlling volume of an electronic device includes receiving a first input signal of a user for requesting to display a volume control user interface (UI), selectively displaying a first volume control UI or a second volume control UI corresponding to whether a content is being played, based on the first input signal, receiving a second input signal of the user through the first or second volume control UI, and controlling a volume level for the content and a volume level for a function of the electronic device together while interconnecting the volume level for the content and the volume level for the function of the electronic device based on the second input signal through the first volume control UI when (Continued)

the content is being played, and controlling one of the volume level for the content and the volume level for the function of the electronic device independently of a remaining volume level based on the second input signal through the second volume control UI when the content is not being played.

15 Claims, 12 Drawing Sheets

(56) References Cited

U.S. PATENT DOCUMENTS

| | | | |
|---|---|---|---|
| 8,874,163 B2 | 10/2014 | Ha et al. | |
| 9,025,783 B2 | 5/2015 | Mahowald | |
| 9,438,194 B2 | 9/2016 | Krishnaswamy et al. | |
| 9,621,699 B2 | 4/2017 | Zatloukal | |
| 9,898,245 B1 * | 2/2018 | Bulis | H04L 12/282 |
| 10,048,930 B1 * | 8/2018 | Vega | H04R 29/001 |
| 10,475,449 B2 * | 11/2019 | Lang | G06F 3/167 |
| 2009/0143054 A1 | 6/2009 | Drescher et al. | |
| 2013/0241918 A1 | 9/2013 | Satyan | |
| 2016/0365839 A1 * | 12/2016 | Marino, Jr. | H04R 3/12 |
| 2017/0185373 A1 * | 6/2017 | Kim | G06F 3/0488 |
| 2017/0223472 A1 * | 8/2017 | Millington | H04R 27/00 |
| 2017/0235543 A1 * | 8/2017 | England | G10L 19/0017 700/94 |
| 2017/0242653 A1 * | 8/2017 | Lang | H04W 8/24 |
| 2018/0267772 A1 * | 9/2018 | Lee | G06F 3/165 |
| 2018/0293045 A1 * | 10/2018 | Lambourne | G05B 15/02 |
| 2019/0096384 A1 * | 3/2019 | Sereshki | H04M 9/082 |
| 2019/0196683 A1 | 6/2019 | Won et al. | |
| 2019/0306607 A1 * | 10/2019 | Clayton | G06F 3/0482 |
| 2020/0084505 A1 * | 3/2020 | Reid | G10L 21/10 |

FOREIGN PATENT DOCUMENTS

| | | |
|---|---|---|
| KR | 10-0692182 B1 | 3/2007 |
| KR | 2012-0103928 A | 9/2012 |
| KR | 2013-0105235 A | 9/2013 |
| KR | 10-1515620 B1 | 5/2015 |
| KR | 10-1581256 B1 | 1/2016 |
| KR | 2017-0124933 A | 11/2017 |
| WO | 2014/201863 A1 | 12/2014 |

* cited by examiner

ELECTRONIC DEVICE AND VOLUME ADJUSTMENT METHOD OF ELECTRONIC DEVICE

TECHNICAL FIELD

Embodiments of the disclosure relate to an electronic device and a technology for controlling the volume of the electronic device.

BACKGROUND ART

In recent years, technology for mobile electronic devices is rapidly developing. In particular, various types of multitasks such as making a call, playing contents, receiving voice feedback, or receiving an alarm may be possible using an electronic device.

In this case, the user may directly set the volume level for the content being played through the electronic device. In addition, the user may directly set a volume level for a function of the electronic device (e.g., a volume level for a ringtone).

For example, the user may select a sound item from items included in the setting list of the setting screen of an electronic device. When the screen through which sound is capable of being set is displayed, the user may adjust the volume level of content by touching and dragging a volume adjuster for the content among items of the screen that can set the sound. Alternatively, the user may touch and drag the volume adjuster for the ringtone to adjust the volume level for the ringtone independently of the volume level for the content.

DISCLOSURE

Technical Problem

The user may independently adjust the volume level for contents and the volume level for a function of an electronic device.

In this case, when the volume level for a function is set to be low, a situation in which the user may not recognize the sound for the function of the electronic device may occur while the content is being played. For example, when a ringtone or notification sound is output at a small level while the content is being played, a situation in which the user misses and does not recognize the ringtone or notification sound may occur.

In addition, when the volume level for the function is set too high, the user may feel an acoustic shock or it may be difficult for the user to focus on the viewing of the content due to the sound of the function of the electronic device generated during content playback.

Accordingly, there is a need to appropriately determine the volume for a function in consideration of the volume of the content being played. In addition, there is a need to provide a user interface which allows a user to use the function.

Technical Solution

In accordance with an aspect of the disclosure, a method of controlling volume of an electronic device includes receiving a first input signal of a user for requesting to display a volume control user interface (UI), selectively displaying a first volume control UI or a second volume control UI corresponding to whether a content is being played, based on the first input signal, receiving a second input signal of the user through the first or second volume control UI, and controlling a volume level for the content and a volume level for a function of the electronic device together while interconnecting the volume level for the content and the volume level for the function of the electronic device based on the second input signal through the first volume control UI when the content is being played, and controlling one of the volume level for the content and the volume level for the function of the electronic device independently of a remaining volume level based on the second input signal through the second volume control UI when the content is not being played.

In accordance with another aspect of the disclosure, an electronic device includes a display, at least one processor, and at least one memory electrically connected to the display and the at least one processor, wherein the at least one memory stores at least one instruction that, when executed, causes the at least one processor to control the display to selectively display a first volume control UI or a second volume control UI corresponding to whether a content is being played, based on a first input signal of a user for requesting to display a volume control UI when the first input signal is received, control a volume level for the content and a volume level for a function of the electronic device while interconnecting the volume level for the content and the volume level for the function of the electronic device based on a second input signal through the first volume control UI when the content is being played, and control one of the volume level for the content and the volume level for the function of the electronic device independently of a remaining volume level based on the second input signal through the second volume control UI when the content is not being played.

In accordance with still another aspect of the disclosure, a computer program product having computer-readable recording media includes instructions that, when executed, cause a processor to control the display to selectively display a first volume control UI or a second volume control UI corresponding to whether a content is being played, based on a first input signal of a user for requesting to display a volume control UI when the first input signal is received, control a volume level for the content and a volume level for a function of the electronic device while interconnecting the volume level for the content and the volume level for the function of the electronic device based on a second input signal through the first volume control UI when the content is being played, and control one of the volume level for the content and the volume level for the function of the electronic device independently of a remaining volume level based on the second input signal through the second volume control UI when the content is not being played.

Advantageous Effects

According to the disclosure, different volume control UIs are provided according to whether or not content is being played, so that user operation convenience can be greatly improved.

In addition, while the content is being played, a volume level for content and a volume level for a function of an electronic device are interlocked, so that a volume level for a function in consideration of the volume level of the content may be provided.

In addition, effects obtained by the disclosure may not be limited to the above, and other effects will be clearly understandable to those having ordinary skill in the art from the following disclosures.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

In the disclosure, content may include video (or video), audio, or a combination thereof. In the disclosure, the volume for content may refer to a volume (or amplitude) of a sound that is output from an electronic device as the content is played.

In the disclosure, the volume for a function of an electronic device may be a volume for a unique function provided by an electronic device different from a volume for content. For example, the volume for a function may include at least one of a ringtone volume, an alarm sound volume, a system sound volume, and a vibration volume generated corresponding to a vibration intensity of an electronic device.

In the disclosure, a user input may include an input using a user's finger or an input using a stylus pen. In this case, the user input may include, for example, a user gesture. The user gesture may include a touch gesture, a hold (or long press) gesture, a drag gesture, a drag and hold gesture, a pinch zoom in/out gesture, a swipe gesture, a tap gesture, a double tap gesture, and the like. In addition, the user input may include a hovering input that does not require a user's finger or a stylus pen to directly touch the screen of an electronic device.

Figure 1:
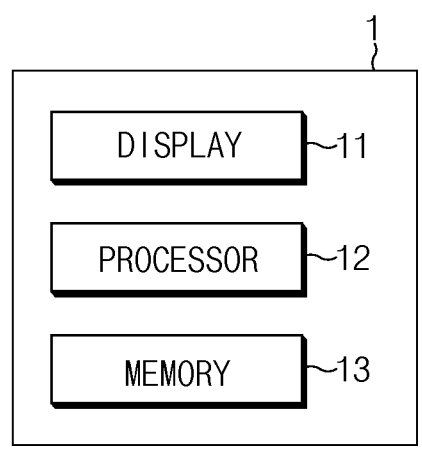
FIG. 1 is a block diagram illustrating an electronic device according to various embodiments of the disclosure.

FIG. 1 is a block diagram illustrating an electronic device according to various embodiments of the disclosure.

In FIG. 1, an electronic device 1 may include a display 11, a processor 12, and a memory 13.

The display 11 may display at least one piece of information (e.g., a user interface (UI)). The display 11 may be combined with a touch circuit to form a touch screen. The details of the display 11 will be described later with reference to FIGS. 11 and 12.

The processor 12 may execute a program stored in the memory 13 to control at least one component of the electronic device 1 or process various data to control the display 11 to display information. The details of the processor 12 will be described later with reference to FIG. 11, and duplicate descriptions will be omitted.

In various embodiments, when a first input signal of a user for requesting to display a volume control UI is received, the processor 12 may control the display 11 to selectively display a first or second volume control UI based on the first input signal according to whether content is being played. When the content is being played, the processor 12 may adjust the volume level for the content and the volume level for a function of the electronic device 1 in conjunction with each other based on a second input signal through the first volume control UI. On the other hand, when the content is not being played, the processor 12 may adjust one of the volume level for the content and the volume level for the function of the electronic device independently of the other, based on the second input signal through the second volume control UI.

The memory 13 may store various data such as software, input or output data for commands used by at least one component of the electronic device 1. The details of the memory 13 will be described later with reference to FIG. 11, and duplicate descriptions will be omitted.

According to various embodiments, the memory 13 may store at least one instruction that, when executed, causes the processor 12 to control the display to selectively display the first or second volume control UI corresponding to whether content is being played, based on the first input signal of the user when the first input signal is received for requesting to display a volume control UI, control a volume level for the content and a volume level for a function of the electronic device while interconnecting the volume level for the content and the volume level for the function of the electronic device based on a second input signal through the first volume control UI when the content is being played, and control one of the volume level for the content and the volume level for the function of the electronic device independently of a remaining volume level based on the second input signal through the second volume control UI when the content is not being played.

As described above, different volume control UIs may be automatically provided based on whether the content is being played, so that the operation convenience of a user manipulating the volume level for the content and the volume level for the function may be greatly improved.

In particular, while content is being played, the volume levels for the content and the function of an electronic device may be adjusted in conjunction with the volume levels, so that the volume level suitable for the function may be provided corresponding to the volume level of the content. Accordingly, it is possible to prevent a user from missing a sound (e.g., a ringtone or a notification sound) for a function of an electronic device generated while content is being played. In addition, it is possible to minimize a user's auditory shock by preventing the sound for a function of an electronic device from being suddenly output at a high volume while content is being played.

According to various embodiments, the memory 13 may store at least one instruction that, when executed, causes the processor 12 to control the volume level for the content, and control the volume level for the function of the electronic device corresponding to an output volume value of the content output at the controlled volume level for a specified time. In this case, the output volume value of the content may include an equivalent sound level value of the content output at the controlled volume level for the specified time.

As described above, the volume level for the function may be adjusted by using the actual output volume value of the content output for a specified time, so that it is possible to allow the user to naturally recognize the sound for the function while the content is being played. That is, the user may recognize the sound for the function even while the content is output at a high volume, and the user may recognize the sound for the function within a range that does not cause the user's auditory shock while the content is output at a low volume.

According to various embodiments, the memory 13 may store at least one instruction that, when executed, causes the processor 12 to control the volume level for the content and the volume level for the function of the electronic device while interconnecting the volume level for the content and the volume level for the function of the electronic device based on a sound output type for the function of the electronic device when the volume level for the content and the volume level for the function of the electronic device are controlled while being interconnected. The sound output type for the function may include a type of pausing the sound for the content and outputting the sound for the function, a type of reducing the sound of the content and outputting the sound for the function, and a type of outputting the sound for the function while maintaining the sound of the content.

According to various embodiments, the memory 13 may store at least one instruction that, when executed, causes the processor 12 to control the display 11 to activate and display a volume adjuster for the content included in the first volume control UI to be operable, and deactivate and display a volume adjuster for the function to be inoperable when the first volume control UI is selected and displayed.

Accordingly, when the user adjusts the volume adjuster, the user recognizes in advance that the volume levels for the content and the function may be adjusted in conjunction with each other.

According to various embodiments, the memory 13 may store at least one instruction that, when executed, causes the processor 12 to control the display 11 to activate and display each of the volume adjusters for the content and the function included in the second volume control UI to be independently operable when the second volume control UI is selected and displayed.

Accordingly, when the user adjusts the volume adjuster, the user recognizes in advance that the volume level for the content and the volume level for the function can be independently adjusted.

According to various embodiments, the memory 13 may store at least one instruction that, when executed, causes the processor 12 to control the display 11 to change and display a volume level graphic for the content and a volume level graphic for the function included in the first volume control UI together based on the second input signal of the user that moves the volume adjuster included in the first volume control UI.

According to various embodiments, the memory 13 may store at least one instruction that, when executed, causes the processor 12 to control the display 11 to change and display the volume level graphic corresponding to the volume adjuster included in the second volume control UI based on the second input signal of the user that moves the volume adjuster included in the second volume control UI.

Figure 2:
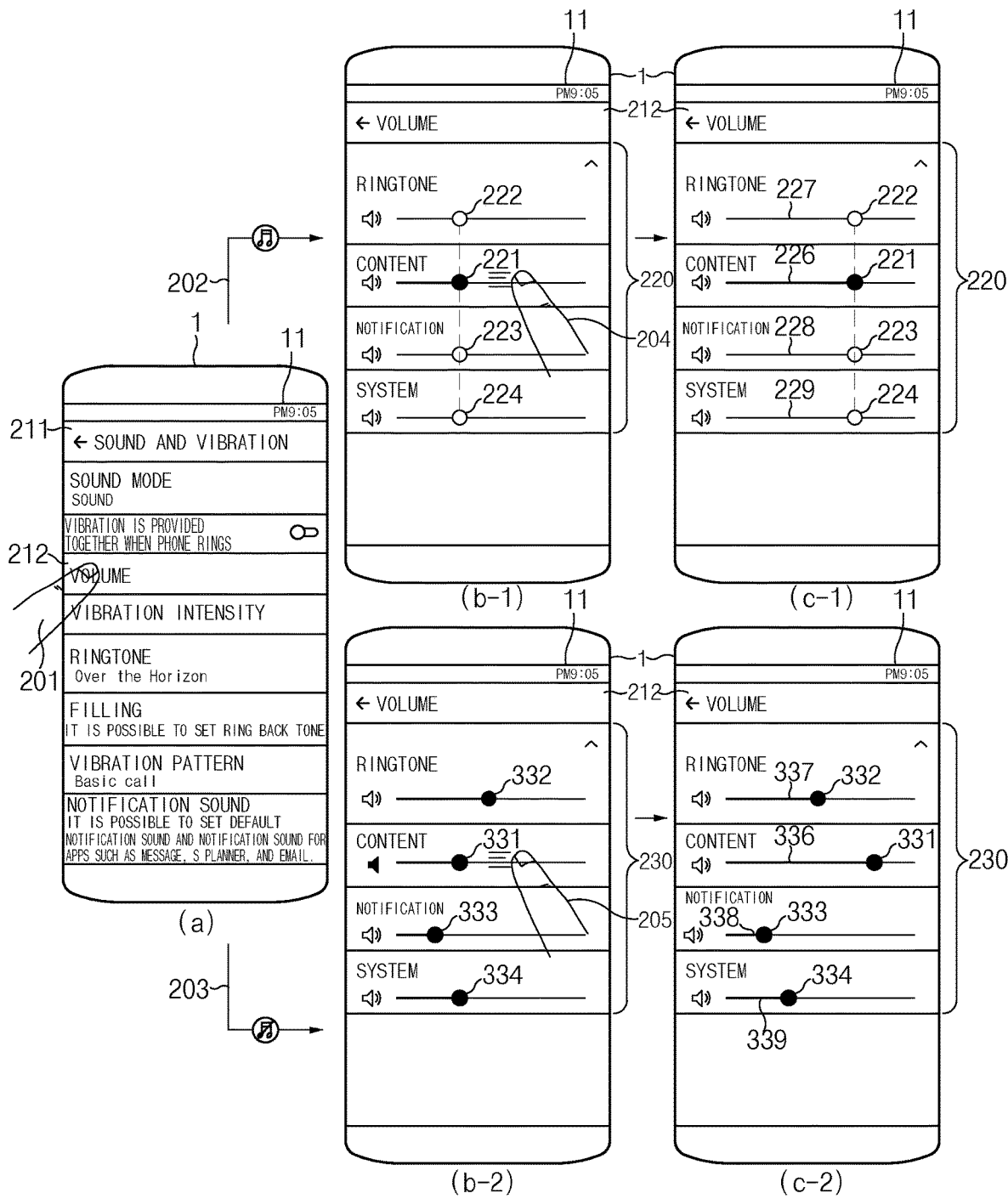
FIG. 2 is a view illustrating a situation in which the electronic device adjusts a volume according to various embodiments of the disclosure.

FIG. 2 is a view illustrating a situation in which the electronic device 1 adjusts a volume according to various embodiments of the disclosure.

In (A) of FIG. 2, the processor 12 of the electronic device 1 may control the display 11 to display a screen 211 in which sound setting is possible.

For example, when a user selects a sound setting item from items (e.g., connection setting, sound setting, vibration setting, notification setting, display setting, background setting, useful function setting, and the like) included in a setting list of a setting screen (not shown) of the electronic device 1, the processor 12 may control the display 11 to display the screen 211 in which sound setting is possible. The screen 211 may include a sound setting list including items for setting sound (e.g., sound mode setting, volume setting, vibration intensity setting, ringtone type setting, call connection sound (e.g., a filling function) setting, vibration pattern setting, notification sound setting, and the like).

Figure 4:
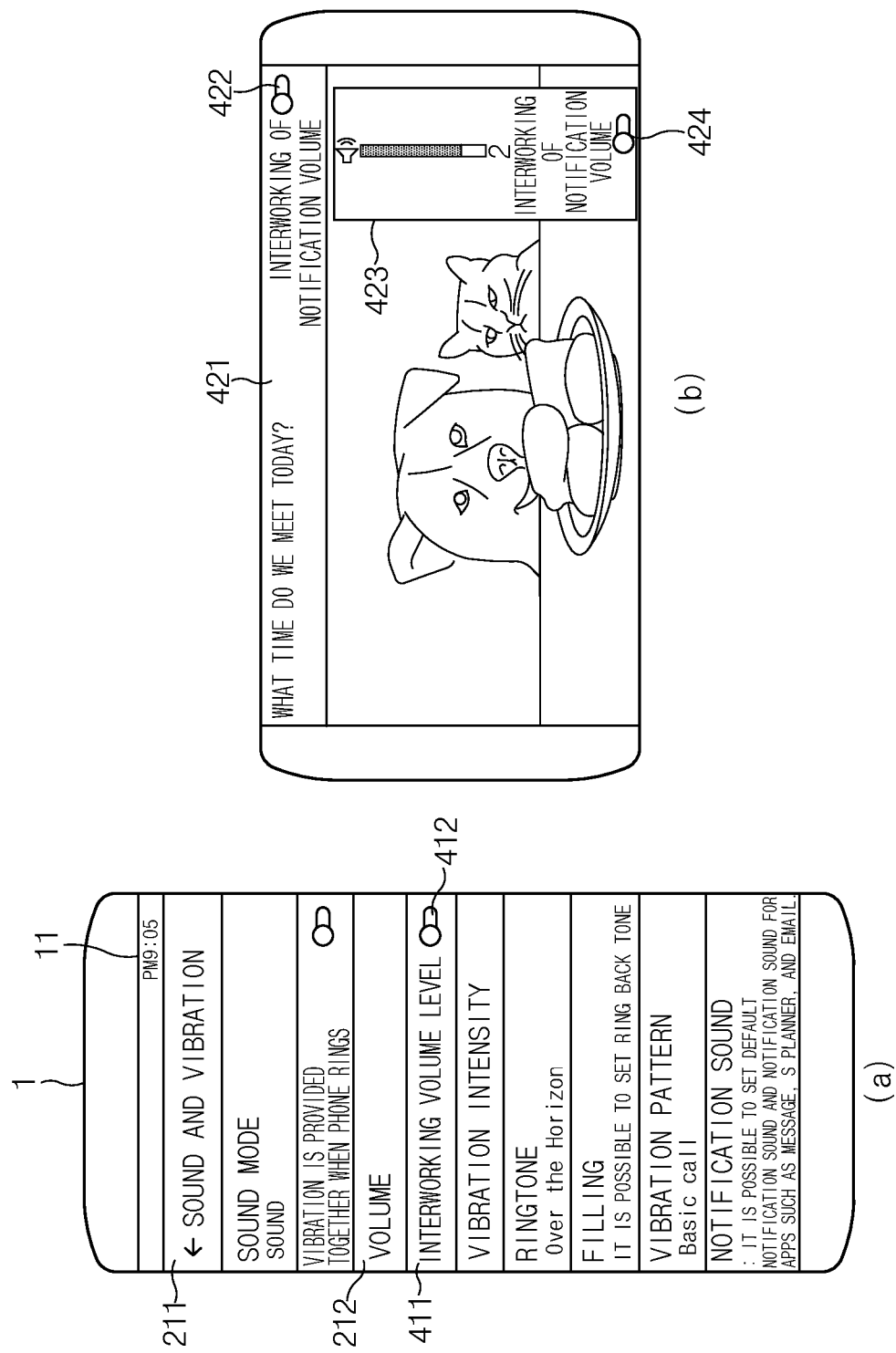
FIG. 4 is a view illustrating execution setting of a volume control UI according to various embodiments of the disclosure.

In (A) of FIG. 2, the user may perform a user input 201 of selecting a volume setting item 212 from a sound setting list in order to display a UI through which the volume can be adjusted. In response to an input signal corresponding to the user input 201, the electronic device 1 may control the display 11 to display a screen 212 through which volume setting is possible. In this case, the electronic device 1 may control the display 11 to selectively display a first volume control UI 220 and a second volume control UI 230 based on whether content is being played. For example, when the function corresponding to a volume interworking item of FIG. 4 to be described later is activated, the electronic device 1 may control the display 11 to display the first volume control UI 220. When the function corresponding to the volume interworking item of FIG. 4 is deactivated, the electronic device 1 may control the display 11 to display the second volume control UI 230. An example of activating the function corresponding to the volume interworking item will be described in detail later with reference to FIG. 4.

For example, the electronic device 1 may determine whether content is being played. In various embodiments, whether the content is being played may be determined in advance before the user input 201 is performed. As the determination result, when it is identified in operation 202 that the content is being played, the electronic device 1 may control the display 11 to display the first volume control UI 220 as shown in (b-1) of FIG. 2.

In (b-1) of FIG. 2, the first volume control UI 220 may include a volume adjuster 221 that can adjust a volume for content (or a volume for media) and volumes (e.g., a volume for a ringtone, a volume for a notification sound, a volume for a system sound, and the like) for functions of the electronic device 1 together in conjunction with each other. For example, the electronic device 1 may activate the volume adjuster 221 for content to be operable, and deactivate volume adjusters 222, 223 and 224 for functions to be inoperable.

In this case, when the user performs a user input 204 for moving the volume adjuster 221 through the first volume control UI 220, in response to the input signal corresponding to the user input 204, the electronic device 1 may adjust the volume levels for content and functions together in conjunction with each other.

In this case, as shown in (C-1) of FIG. 2, the electronic device 1 may control the display 11 to change and display a volume level graphic 226 for content and volume level graphics 227, 228 and 229 for functions included in the first volume control UI 220 together in order to indicate that the volume levels for the content and the functions are adjusted together in conjunction with each other.

According to various embodiments, in response to the input signal corresponding to the user input 204 for moving the volume adjuster 221, the electronic device 1 may adjust the volume level for the function specified in advance among the volume levels for a plurality of functions together in conjunction with the volume level for content. The volume level for a pre-specified function may be a volume level for a function specified as a default in advance so as to interwork with the volume for the content, or a volume level for a function intentionally selected by the user's selection.

According to various embodiments, when the playback of content is terminated or paused, the electronic device 1 may cancel interworking between the volume level for content and the volume levels for functions. In this case, as shown in (b-2) of FIG. 2 to be described later, the electronic device 1 may control the display 11 to activate and display each of the volume adjusters for the content and the functions to be independently operable.

According to various embodiments, the electronic device 1 may include a vibration volume generated corresponding to a vibration intensity by a vibrator (e.g., a motor) inside the electronic device 1 as a volume for a function. In this case, in (b-1) of FIG. 2, in response to the input signal according to the user input 240 through the first volume control UI 220, the electronic device 1 may adjust the volume level for content and the volume level (or vibration level) for the vibration intensity in conjunction with each other.

In (a) of FIG. 2, as a result of determining whether the content is being played by the electronic device 1 in response to the user input 201, when it is determined in operation 203 that the content is not being played, the electronic device 1 may control the display 11 to display the second volume control UI 230 as shown in (b-2) of FIG. 2. In this case, the state in which the content is not being played may include a state in which the playback of the content is terminated, a state in which the content is paused, or a state in which the volume of the content is muted.

In (b-2) of FIG. 2, the second volume control UI 230 may include a volume adjuster 331 capable of adjusting a volume for content and volume adjusters 332, 333, and 334 capable of adjusting volumes for functions of the electronic device 1. In this case, the electronic device 1 may activate and display each of the volume adjusters 331, 332, 333, and 334 for content and functions to be independently operable.

In this case, when the user performs a user input 205 for moving the volume adjuster 331 through the second volume control UI 230, in response to the input signal corresponding to the user input 205, the electronic device 1 may adjust one of the volume level for content and the volume level for a function independently of the other. That is, the electronic device 1 may maintain the volume level for functions and adjust only the volume level for content.

In this case, in order to indicate that the volume level of the content and the volume levels of the functions are independently adjusted, as shown in (c-2) of FIG. 2, the electronic device 1 may control the display 11 to change and display only a volume level graphic 336 for the content included in the first volume control UI 230 and maintain the previous states of volume level graphics 337, 338 and 339 for functions without changing the volume level graphics 337, 338 and 339 for functions.

Figure 3:
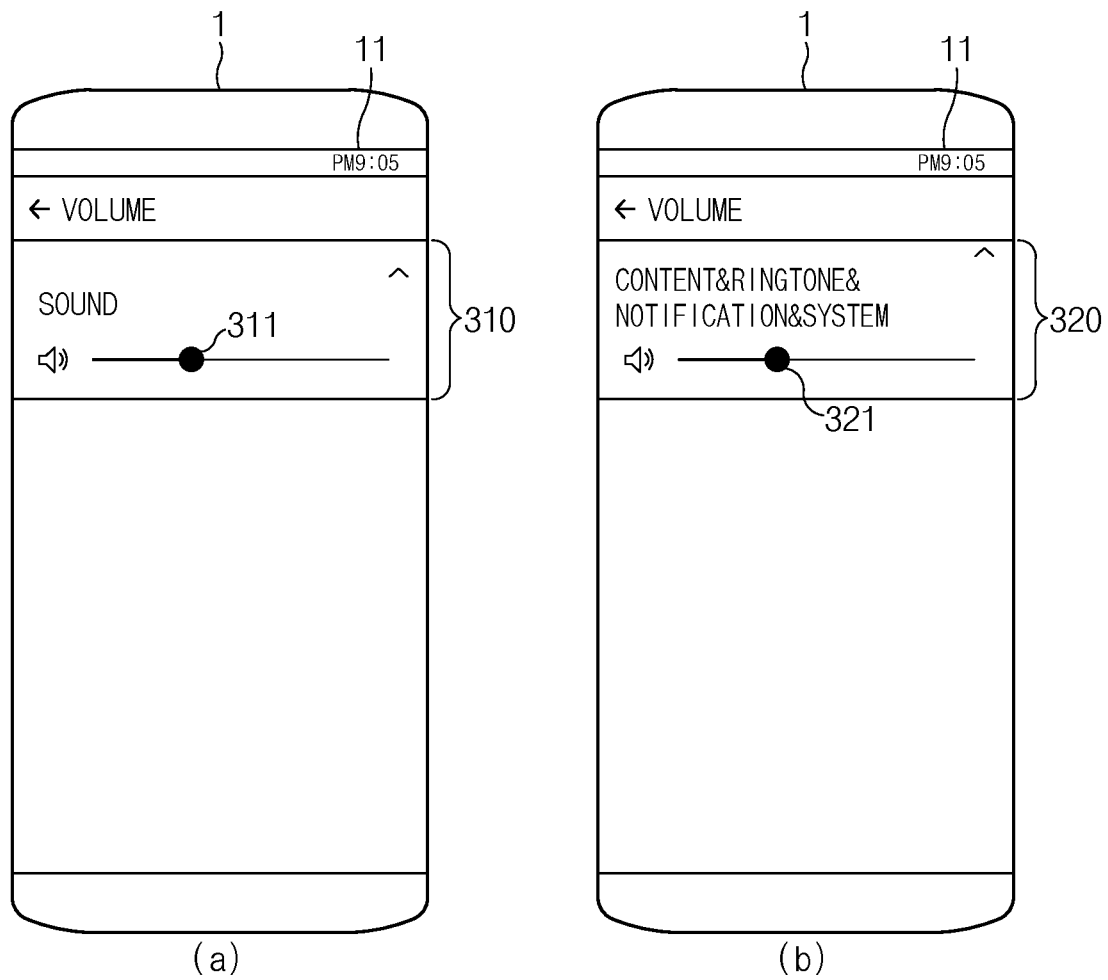
FIG. 3 is a view illustrating volume control UIs according to various embodiments of the disclosure.

FIG. 3 is a view illustrating volume control UIs according to various embodiments of the disclosure.

As described above and shown in (b-1) of FIG. 2, the first volume control UI 220 capable of adjusting the volume level of the content and the volume levels of the functions in conjunction with each other may have various types such as a volume control UI 310 of (a) of FIG. 3 or a volume control UI 320 of (b) of FIG. 3.

In this case, in order to indicate that the volume level for the content and the volume levels for functions interwork with each other, the electronic device 1 may control the display 11 to display one integrated volume adjuster 311 or 321. The form of the integrated volume adjuster 311 or 321 may provide a user with an effect of indicating that the volume level for content and the volume levels for functions are adjusted together even if only one volume is adjusted.

In (a) of FIG. 3, in order to indicate that the volume level of the content and the volume levels of the functions interwork with each other, the electronic device 1 may control the display 11 to display word 'sound' that is an integrated name of the volumes as a title of the volume control UI 310. Alternatively, as shown in (b) of FIG. 3, in order to indicate that the volume level of the content and the volume levels of the functions interwork with each other, the electronic device 1 may control the display 11 to display phrase 'content & ringtone & notification & system' that is a title of the integrated volumes as a title of the volume control UI 310.

FIG. 4 is a view illustrating execution setting of a volume control UI according to various embodiments of the disclosure.

As shown in (a) of FIG. 4, the processor 12 of the electronic device 1 may control the display 11 to display a volume interworking item 411 that enables a user to select whether to interwork a volume level for content (or media) and a volume level for functions (e.g., a volume level for notification sound) on the screen 211 through which sound can be set.

The volume interworking item 411 may include an on/off switch 412 or a check box (not shown) for selecting whether to interwork the volume. When the user selects the volume setting item 212 in a state where the volume interlocking is on, as shown in (b-1) of FIG. 2, or (a) or (b) of FIG. 3, the electronic device 1 may control the display 11 to display the volume control UIs 220, 310 and 320 through which the volumes for content and functions can be adjusted together in conjunction with each other.

Alternatively, as shown in (b) of FIG. 4, the electronic device 1 may receive a notification message while content is being played. In this case, the electronic device 1 may control the display 11 to display a notification message display UI (e.g., a panel, a pop-up window, and the like) 421 including a switch 422 or a check box (not shown) capable of selecting whether to interwork the volume level for the content and the volume level for the function (e.g., the volume level for the notification sound).

According to various embodiments, the electronic device 1 may control the display 11 to display a content volume control UI (e.g., a panel, a pop-up window, and the like) 423 including a switch 424 or a check box (not shown) capable of selecting whether to interwork the volume level for the content and the volume level for the function. In this case, the switch 424 or the check box (not shown) may be automatically included in and displayed in the content volume control UI 423 whenever a notification message is received. Alternatively, the switch 424 or the check box (not shown) may be displayed together when the content volume control UI 423 is displayed regardless of whether the notification message is received. Alternatively, the switch 424 or the check box (not shown) may be displayed when the content volume control UI 423 is executed within a specified time after the notification message is received.

According to various embodiments, the first volume control UI 220 of (b-1) and (c-1) of FIG. 2 described above may be displayed only when a function corresponding to the volume interworking item for selecting whether to interwork volume in FIG. 4 is activated. For example, in the state that the switch 412 of the volume interworking item 411, the switch 422 of the notification message display UI 421, or the switch 424 of the content volume control UI 423 is turned on, when the user input 201 for selecting the volume setting item 212 in (a) of FIG. 2 is performed, in FIG. 2, the electronic device 1 may control the display 11 to selectively display one among the first and second volume control UIs 220 and 230 corresponding to whether content is being played. That is, when an explicit interworking permission operation of a user for activating a function corresponding to the volume interworking item is preceded, the electronic device 1 may control the display 11 to selectively display one among the first and second volume control UIs 220 and 230 based on whether content is being played.

According to various embodiments, when a function corresponding to the volume interworking item is activated and content is being played, the electronic device 1 may control the display 11 to display the first volume control UI 220 of FIG. 2. When the function corresponding to the volume interworking item is activated and content is not being played, the electronic device 1 may control the display 11 to display the second volume control UI 230 of FIG. 2.

According to various embodiments, when the function corresponding to the volume interworking item is activated regardless of whether content is played, the electronic device 1 may control the display 11 to display the first volume control UI 220 of FIG. 2. When the function corresponding to the volume interworking item is deactivated, the electronic device 1 may control the display 11 to display the second volume control UI 230 of FIG. 2.

According to various embodiments, when content is being played regardless of the function corresponding to the volume interworking item, the electronic device 1 may control the display 11 to display the first volume control UI 220 of FIG. 2. When the content is not being played, the electronic device 1 may control the display 11 to display the second volume control UI 230 of FIG. 2.

Figure 5:
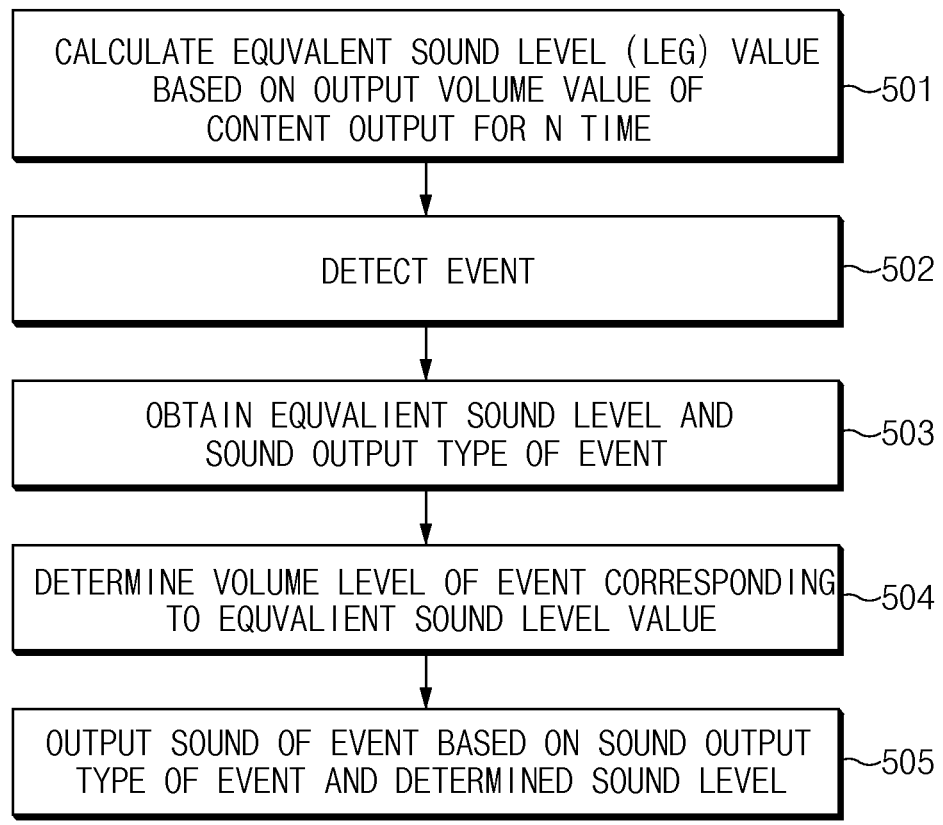
FIG. 5 is a flowchart of determining a volume level for functions according to various embodiments of the disclosure.

FIG. 5 is a flowchart of determining a volume level for functions according to various embodiments of the disclosure.

In FIG. 5, the processor 12 of the electronic device 1 may adjust a volume level for a function of the electronic device corresponding to an output volume value for content.

First, in operation 501, the electronic device 1 may calculate an equivalent sound level value Leq of the content, based on the output volume value of the content which is being output for N time (e.g., a value between 1 second and 10 seconds).

Figure 6:
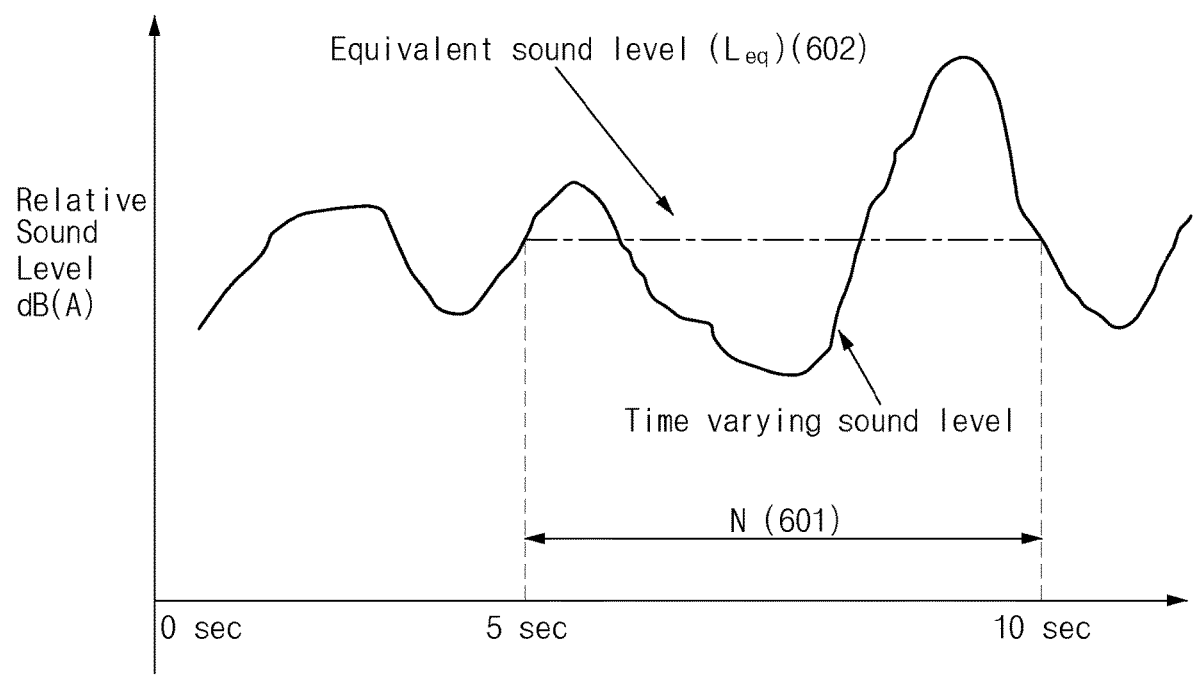
FIG. 6 is a graph illustrating an equivalent sound level value of content according to various embodiments of the disclosure.

FIG. 6 is a graph illustrating an equivalent sound level value of content.

In FIG. 6, the output volume value (or the intensity of the output volume, the amplitude of the output volume) of the content may change over time. In this case, based on the output volume value of the content, an equivalent sound level value Leq 602 for N time (e.g., 5 seconds) 601 may be calculated. The equivalent sound pressure level may be the average value of the output volume value for the N time 601, the average value of the integral value of the output volume value for the N time 601, or the power average value for the N time 601. Alternatively, the average sound pressure level may be a value in which a weight is applied to the average value described above.

In FIG. 5 again, when the equivalent sound pressure level value is calculated in operation 501, the electronic device 1 may detect an event (e.g., a notification event) for a function of the electronic device 1 in operation 502. For example, the electronic device 1 may detect an event that occurs when a call is received, a notification message is received, or it reaches an alarm time.

When an event for a function is detected, in operation 503, the electronic device 1 may obtain the equivalent sound level value calculated based on the output volume value of the content which is being output for N time before detection of the event. Alternatively, when an event for a function is detected, the electronic device 1 may obtain the output volume value of the content which is being output for N time and calculate the equivalent sound level value therefrom.

In addition, when an event for a function is detected, in operation 503, the electronic device 1 may obtain a sound output type (hereinafter, referred to as a sound output type for a function) of the event for the detected function. The sound output type for a function may include, for example, a content sound pause type, a content sound reduction type, and a content sound mixing type.

Figure 7:
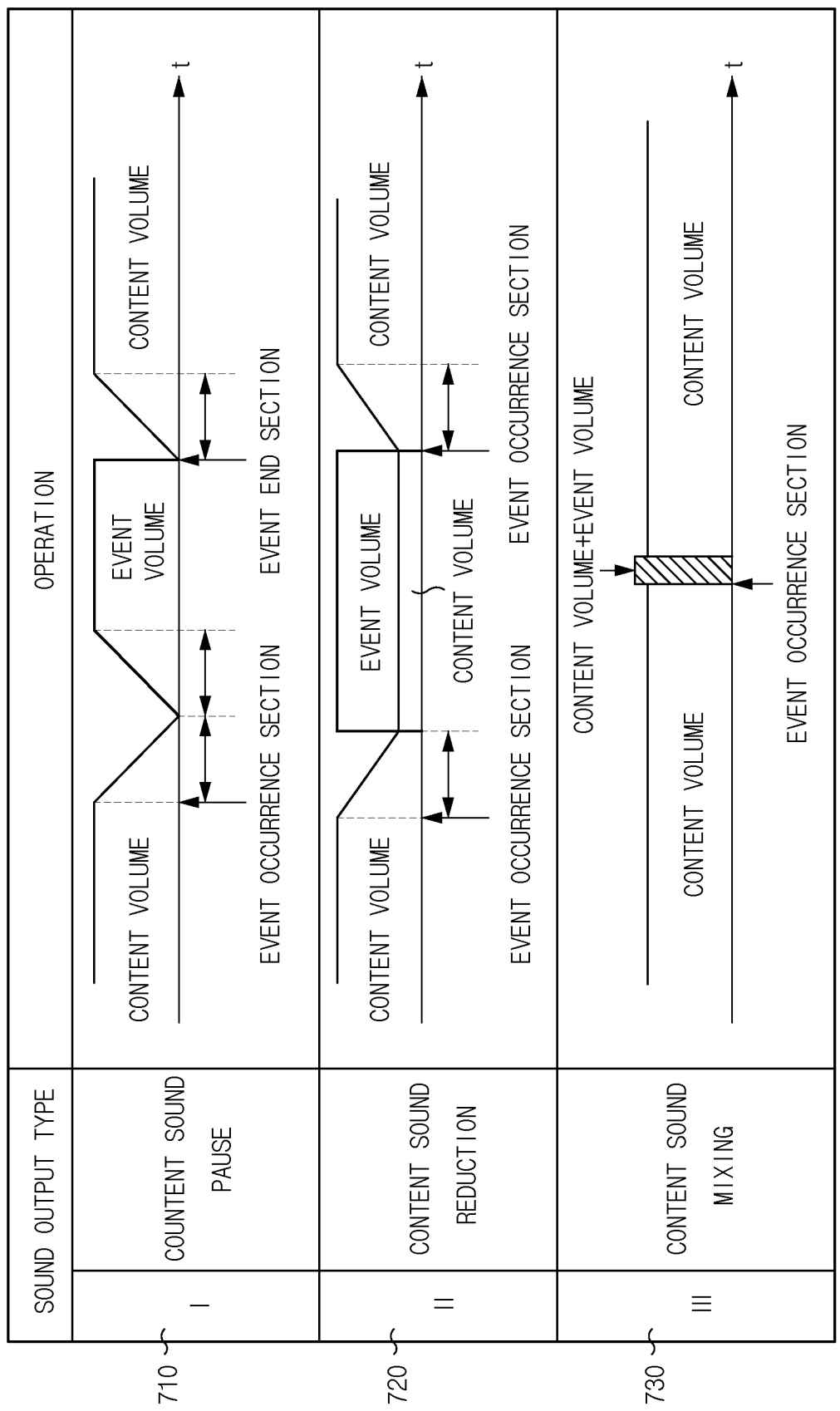
FIG. 7 is a table illustrating sound output types for functions according to various embodiments of the disclosure.

FIG. 7 is a table illustrating sound output types for functions of the electronic device 1.

In 710 of FIG. 7, when an event for a function occurs, the content sound pause type may pause the sound of the content and output a sound for the function during the paused time period. The sound for the function of the electronic device 1 output corresponding to the content sound pause type may be, for example, a ringtone sound, a notification sound, an alarm sound, a timer sound, or the like.

In addition, in 720 of FIG. 7, when an event for a function occurs, the content sound reduction type may reduce the sound of the content and output a sound for the event during a period in which the sound is reduced. The sound for the function of the electronic device 1 output corresponding to the content sound reduction type may be, for example, a sound generated when a message or e-mail is received, a sound generated when a calendar event occurs, a text-to-speech (TTS) sound, and Bixby voice feedback sound, or a Samsung health guide sound.

In addition, in 730 of FIG. 7, when an event for a function occurs, the content volume mixing type may output a volume for the event without decreasing the volume of the content. The sound for a function of the electronic device 1 output corresponding to the content sound mixing type may be, for example, a system sound (e.g., a camera shutter sound).

Meanwhile, the sound output type for the function of the electronic device 1 described above is merely an example, and various sound output types in which the sound of the content and the sound of the function are output together may be possible.

According to various embodiments, when the electronic device 1 includes a vibration volume as the volume for a function, the sound output types for the above-described functions may be similarly applied to a situation in which vibration occurs. For example, the electronic device 1 may pause the sound of the content and vibrate the electronic device 1 during the paused time period. Alternatively, the electronic device 1 may reduce the sound of the content and vibrate the electronic device 1 during a time period for which the sound is reduced. Alternatively, the electronic device 1 may vibrate the electronic device 1 without reducing the volume of the content.

Referring to FIG. 5 again, when the equivalent sound level value and the sound output type of the event are acquired in operation 503, the electronic device 1 may determine the volume level of the event for the function corresponding to the equivalent sound level value in operation 504.

Figure 8:
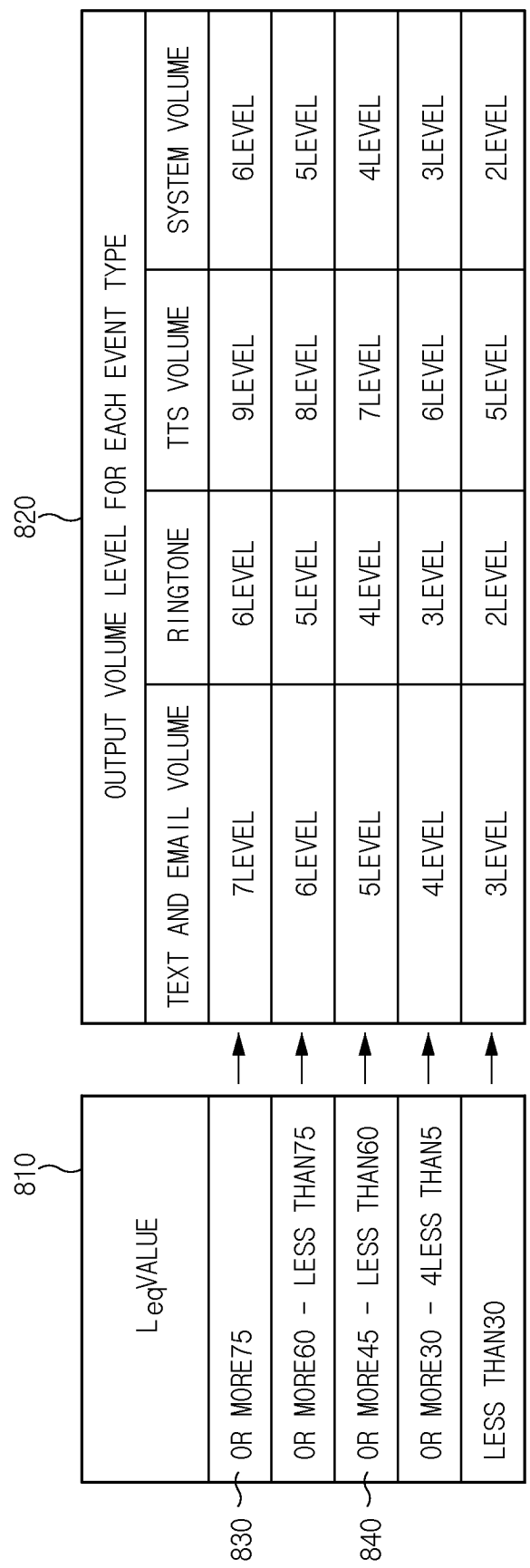
FIG. 8 is a table illustrating a volume level output for each event type corresponding to an equivalent sound level value according to various embodiments of the disclosure.

FIG. 8 is a table illustrating a volume level output for each event type corresponding to an equivalent sound level value of the electronic device 1.

Reference numeral 810 of FIG. 8 denotes an equivalent sound level value of content, and reference numeral 820 of FIG. 8 denotes an output sound level for each event type corresponding to the equivalent sound level value.

For example, in 830 of FIG. 8, when it is determined that the equivalent sound level value of content is 75 dB or more, based on the maximum level of 15, the text and email sound level, ringtone sound level, TTS sound level, and system sound level may be determined as level 7, level 6, level 9, and level 6, respectively. As another example, in 840 of FIG. 8, when it is determined that the equivalent sound level value of the content is 45 dB or more and less than 60 dB, based on the maximum level of 15, the text and email sound level, ringtone sound level, TTS sound level, and system sound level may be determined as level 5, level 4, level 7, and level 4, respectively.

In FIG. 5 again, when the output sound level of the event corresponding to the equivalent sound level value is determined in operation 504, the electronic device 1 may output the sound of the event based on the obtained sound output type and the determined sound level of the event in operation 503 of FIG. 5. According to various embodiments, the sound output type of the event may be performed after operation 504.

Figure 9:
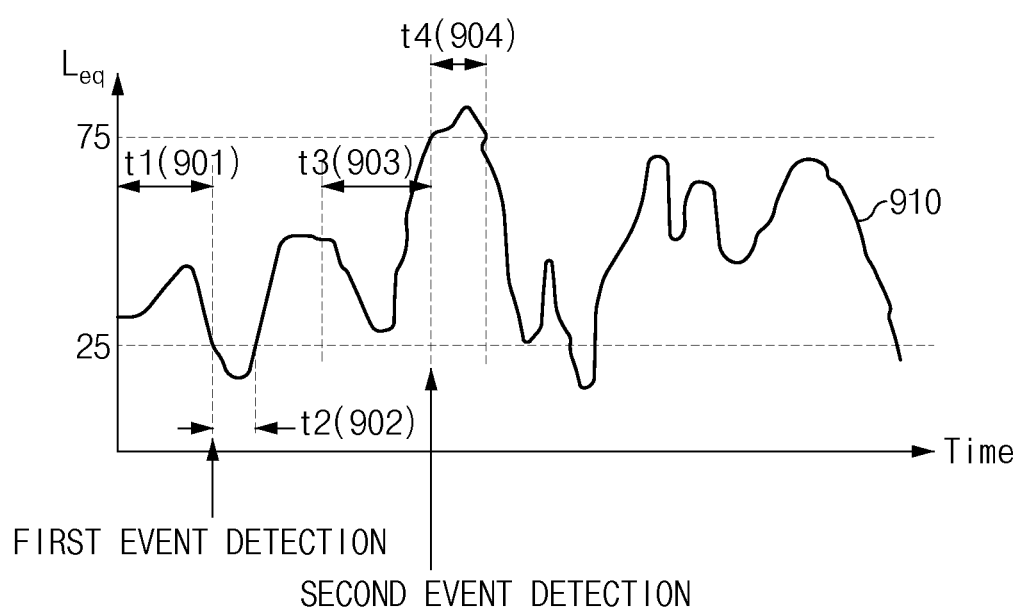
FIG. 9 is a graph illustrating a situation in which a sound of an event is output while content is being played according to various embodiments of the disclosure.

FIG. 9 is a graph illustrating a situation in which a sound of an event is output while content is being played according to various embodiments of the disclosure. In FIG. 9, when an event for a function is detected while content is being played, the electronic device 1 may output the sound of the event based on the equivalent sound pressure level of the content. For example, while a user listens to content by using a Bluetooth headset, the electronic device 1 may output a notification sound according to the disclosure. Alternatively, while the user listens to content by using an exercise headset, the electronic device 1 may output an exercise voice guide according to the disclosure.

In this case, FIG. 9 illustrates a state in which the user may set the volume level of the content to level 10 based on the maximum level of 15. In FIG. 9, a graph 910 may represent the intensity of a volume of content that changes over time.

In this situation, the electronic device 1 may detect an event for a function. In FIG. 9, when the first event is detected, the electronic device 1 may calculate the equivalent sound pressure level of the content output during a specified time t1 901 before a first event is detected, and based on the calculated equivalent sound pressure level, determine the sound level of the first event. In addition, the electronic device 1 may output the sound of the first event at a sound volume (e.g., 25 dB) corresponding to the determined volume level during a specified time t2 902. As another example, in FIG. 9, when a second event is detected, the electronic device 1 may calculate the equivalent sound pressure level of the content output during a specified time t3 903 before the second event is received, and determine the sound level of the second event based on the calculated equivalent sound pressure level. In addition, the electronic device 1 may output the sound of the first event at the sound volume (e.g., 75 dB) corresponding to the determined volume level for a specified time t4 904.

Figure 10:
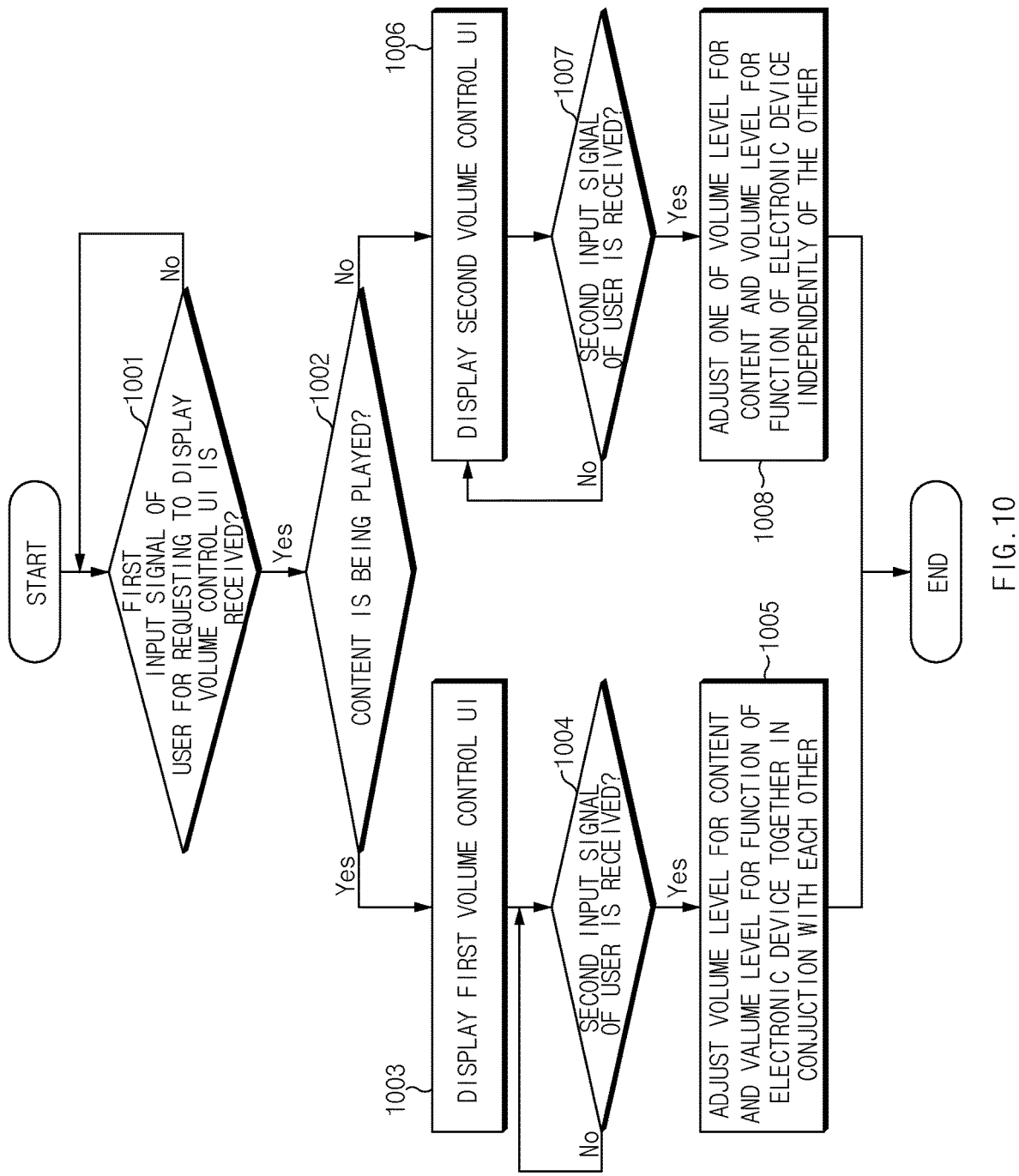
FIG. 10 is a flowchart illustrating an electronic device for transmitting content according to various embodiments of the disclosure.

FIG. 10 is a flowchart illustrating the electronic device 1 for transmitting content according to various embodiments of the disclosure.

First, in operation 1001, the electronic device 1 may determine whether a first input signal of a user for requesting to display a volume control UI is received.

When the first input signal is received in operation 1001 (Yes), in operation 1002, the electronic device 1 may determine whether the content is being played.

When it is determined in operation 1002 that the content is being played (Yes), in operation 1003, the electronic device 1 may display the first volume control UI. In this case, the electronic device 1 may activate and display a volume adjuster for content included in the first volume control UI to be operable, and deactivate and display the volume adjuster for a function to be inoperable.

In operation 1004, while the first volume control UI is displayed, the electronic device 1 may determine whether a second input signal of a user is received. When it is determined in operation 1004 that the second input signal is received (Yes), the electronic device 1 may adjust the volume level for the content and the volume level for the function of the electronic device in conjunction with each other in operation 1005.

According to various embodiments, the electronic device 1 may adjust the volume level for the content, and adjust the volume level for the function of the electronic device 1 corresponding to the output volume value of the content output at the volume level adjusted for a specified time. In this case, the output volume value of the content may be an equivalent sound level value of the content output at the volume level adjusted for the specified time.

According to various embodiments, the electronic device 1 may adjust the volume level for the content and the volume level for the function of the electronic device 1 based on the sound output type for the function of the electronic device 1 in conjunction with each other. The sound output type for the function is a type that pauses the sound of the content and outputs the sound for the function, a type that reduces the sound of the content and outputs the sound for the function, and a type that outputs the sound for the function while maintaining the sound for the content.

According to various embodiments, the electronic device 1 may change and display a volume level graphic for content and a volume level graphic for a function included in the first volume control UI together based on the second input signal.

In operation 1002, when it is determined that the content is not being played (1002—No), the electronic device 10 may display a second volume control UI (1006). In this case, the electronic device 1 may activate and display each of a volume adjuster for content and a volume adjuster for a function included in the second volume control UI to be independently operable.

In operation 1007, while the second volume control UI is displayed, the electronic device 1 may determine whether a second input signal of a user is received. When it is determined in operation 1007 that the second input signal is received (Yes), the electronic device 1 may adjust one of the volume level for the content and the volume level for the function of the electronic device independently of the other.

According to various embodiments, the electronic device 1 may change and display a volume level graphic corresponding to a volume adjuster included in the second volume control UI based on the second input signal.

Figure 11:
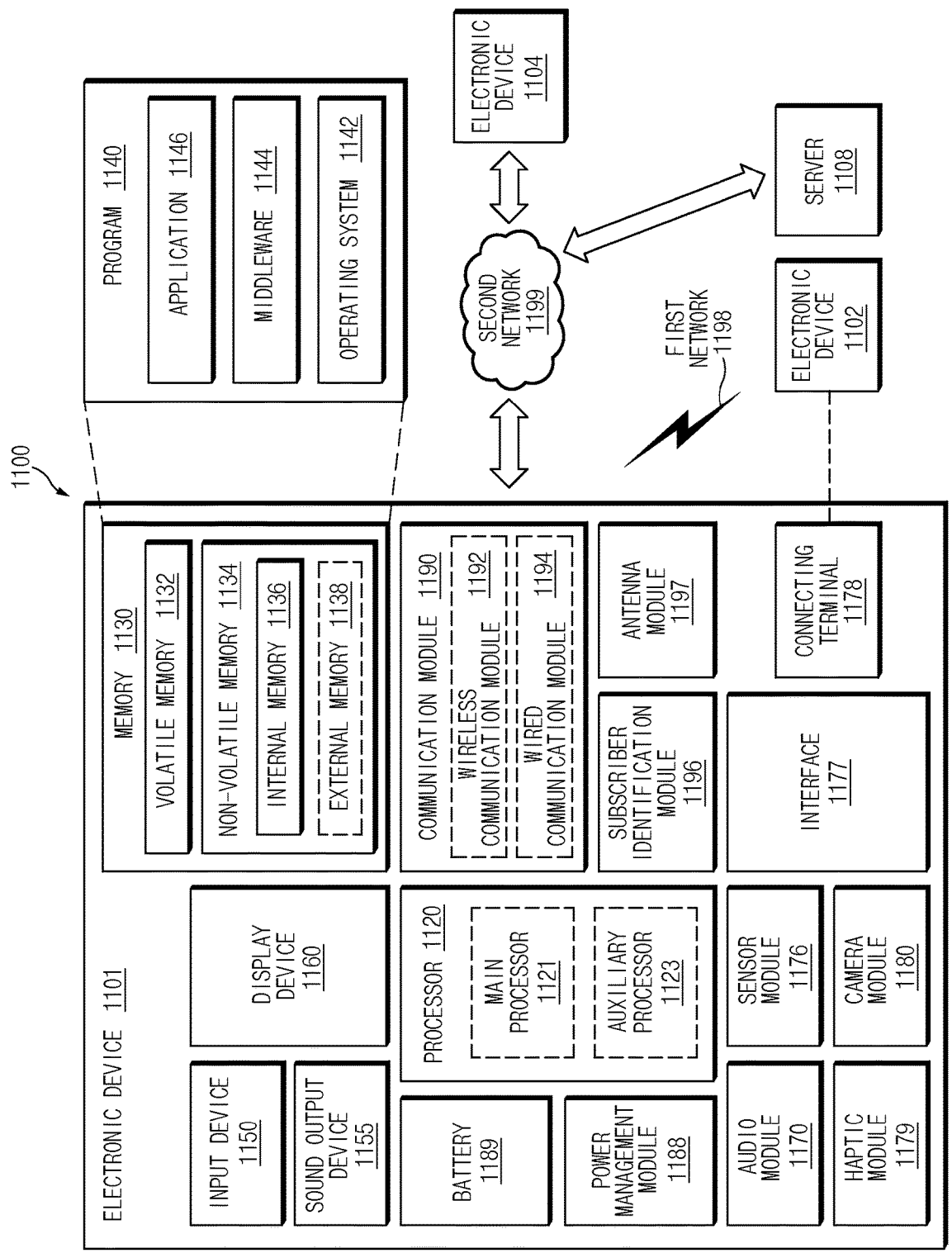
FIG. 11 is a block diagram of an electronic device in a network environment according to various embodiments.

FIG. 11 is a block diagram illustrating an electronic device 1101 in a network environment 1100 according to various embodiments. Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, or a keyboard.

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector), The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™ wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment, the antenna module 1197 may include one or more antennas, and, therefrom, at least one antenna appropriate for a communication scheme used in the communication network, such as the first network 1198 or the second network 1199, may be selected, for example, by the communication module 1190 (e.g., the wireless communication module 1192). The signal or the power may then be transmitted or received between the communication module 1190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

Figure 12:
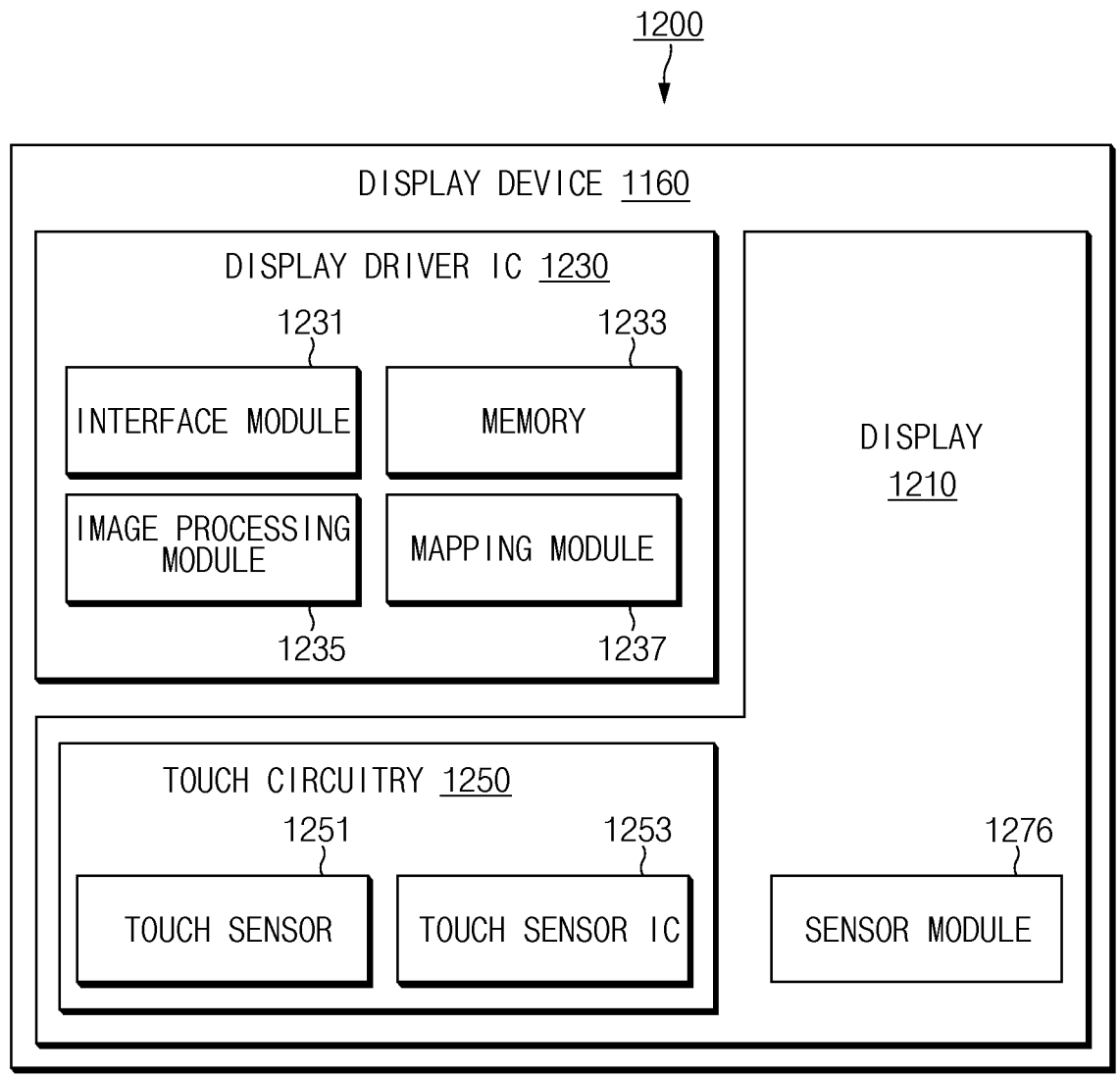
FIG. 12 is a block diagram of a display device according to various embodiments.

FIG. 12 is a block diagram of the display device 1160 of FIG. 11 according to various embodiments. Referring to FIG. 12, the display device 1160 may include a display 1210 and a display driver IC (DDI) 1230 for controlling the display 1210. The DDI 1230 may include an interface module 1231, a memory 1233 (e.g., a buffer memory), an image processing module 1235, or a mapping module 1237. For example, the DDI 1230 may receive image information including image data or an image control signal corresponding to a command for controlling the image data from other components of the electronic device 1101 through the interface module 1231. For example, according to an embodiment, the image information may be received from a processor 1120 (e.g., a main processor 1121 (e.g., an application processor)) or an auxiliary processor 1123 (e.g., the graphic processing device), which is operated independently of the main processor 1121. The DDI 1230 may communicate with a touch circuit 1250, a sensor module 1176, or the like through the interface module 1231. In addition, the DDI 1230 may store at least a part of the received image information in the memory 1233, for example, in units of frames. For example, the image processing module 1235 may perform preprocessing or post-processing (e.g., adjustment of resolution, brightness, or size) on at least a part of the image data based at least partially on characteristics of the image data or the display 1210. The mapping module 1237 may generate a voltage value or a current value corresponding to the image data preprocessed or post-processed through the image processing module 1135. According to an embodiment, the voltage value or the current value may be generated based at least partially on attributes of the pixels of the display 1210 (e.g., an array of pixels (RGB stripe or pentile) or a size of each subpixel). For example, at least some pixels of the display 1210 may be driven based on at least a part of the voltage or current value, such that visual information (e.g., a text, an image, or an icon) corresponding to the image data is displayed on the display 1210.

According to an embodiment, the display device 1160 may further include the touch circuit 1250. The touch circuit 1250 may include a touch sensor 1251 and a touch sensor IC 1253 for controlling the touch sensor 1251. For example, the touch sensor IC 1253 may control the touch sensor 1251 to detect a touch input or a hovering input at a specific position of the display 1210. For example, the touch sensor IC 1253 may measure a change in a signal (e.g., a voltage, a light amount, a resistance, or a charge amount) at a specific position of the display 1210 to detect a touch input or a hovering input. The touch sensor IC 1253 may provide information (e.g., a location, an area, a pressure or a time) about the detected touch input or hovering input to the processor 1120. According to an embodiment, at least a part (e.g., the touch sensor IC 1253) of the touch circuit 1250 may be included as a part of the display driver IC 1230 or the display 1210, or as a part of another component (e.g., the auxiliary processor 1123) arranged outside the display device 1160.

According to an embodiment, the display device 1160 may further include at least one sensor (e.g., a fingerprint sensor, an iris sensor, a pressure sensor or an illuminance sensor) of the sensor module 1176, or a control circuitry thereof. In this case, the at least one sensor or the control circuitry thereof may be embedded in a part (e.g., the display 1210 or the DDI 1230) of the display device 1160 or a part of the touch circuit 1250. For example, when the sensor module 1176 embedded in the display 1160 includes a biometric sensor (e.g., a fingerprint sensor), the biometric sensor may obtain biometric information (e.g., fingerprint image) associated with a touch input through an area of the display 1210. As another example, when the sensor module 1176 embedded in the display device 1160 includes a pressure sensor, the pressure sensor may obtain information about a pressure corresponding to a touch input through an area or entire area of the display 1210. According to an embodiment, the touch sensor 1251 or the sensor module 1176 may be arranged between pixels of the pixel layer of the display 1210, or above or below the pixel layer.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A method of controlling volume of an electronic device, the method comprising:
   receiving a first input signal of a user for requesting to display a volume control user interface (UI);
   selectively displaying a first volume control UI or a second volume control UI corresponding to whether a content is being played, based on the first input signal;
   receiving a second input signal of the user through the first or second volume control UI; and
   controlling a volume level for the content and a volume level for a function of the electronic device together while interconnecting the volume level for the content and the volume level for the function of the electronic device based on the second input signal through the first volume control UI when the content is being played, and
   controlling one of the volume level for the content and the volume level for the function of the electronic device independently of a remaining volume level based on the second input signal through the second volume control UI when the content is not being played.

2. The method of claim 1, wherein the controlling of the volume level for the content and the volume level for the function of the electronic device includes:
controlling the volume level for the content; and
controlling the volume level for the function of the electronic device corresponding to an output volume value of the content output at the controlled volume level for a specified time.

3. The method of claim 2, wherein the output volume value of the content includes:
an equivalent sound level value of the content output at the controlled volume level for the specified time.

4. The method of claim 1, wherein the controlling of the volume level for the content and the volume level for the function of the electronic device includes:
controlling the volume level for the content and the volume level for the function of the electronic device while interconnecting the volume level for the content and the volume level for the function of the electronic device based on a sound output type for the function of the electronic device.

5. The method of claim 4, wherein the sound output type for the function includes:
at least one of a type of pausing a sound for the content and outputting a sound for the function, a type of reducing the sound for the content and outputting the sound for the function, and a type of outputting the sound for the function while maintaining the sound of the content.

6. The method of claim 1, wherein the selective displaying of the first or second volume control UI includes:
activating and displaying a volume adjuster for the content included in the first volume control UI to be operable, and deactivating and displaying a volume adjuster for the function to be inoperable when the first volume control UI is selected and displayed.

7. The method of claim 1, wherein the selective displaying of the first or second volume control UI includes:
activating and displaying each of a volume adjuster for the content and a volume adjuster for the function included in the second volume control UI to be independently operable when the second volume control UI is selected and displayed.

8. The method of claim 1, further comprising:
changing and displaying a volume level graphic for a content included in the first volume control UI and a volume level graphic for a function together based on the second input signal when the second input signal is for moving a volume adjuster included in the first volume control UI.

9. The method of claim 1, further comprising:
changing and displaying a volume level graphic corresponding to a volume adjuster included in the second volume control UI based on the second input signal when the second input signal is for moving the volume adjuster included in the second volume control UI.

10. The method of claim 1, wherein the volume level for the function includes at least one of a volume level for a ringtone, a volume level for a notification sound, a volume level for an alarm sound, a volume level for a system sound, and a vibration intensity level of the electronic device.

11. An electronic device comprising:
a display;
at least one processor; and
at least one memory electrically connected to the display and the at least one processor, wherein the at least one memory stores at least one instruction that, when executed, causes the at least one processor to:
control the display to selectively display a first volume control UI or a second volume control UI corresponding to whether a content is being played, based on a first input signal of a user for requesting to display a volume control UI when the first input signal is received;
control a volume level for the content and a volume level for a function of the electronic device while interconnecting the volume level for the content and the volume level for the function of the electronic device based on a second input signal through the first volume control UI when the content is being played; and
control one of the volume level for the content and the volume level for the function of the electronic device independently of a remaining volume level based on the second input signal through the second volume control UI when the content is not being played.

12. The electronic device of claim 11, wherein the at least one memory stores at least one instruction that, when executed, causes the at least one processor to:
control the volume level for the content when the volume level for the content and the volume level for the function of the electronic device are controlled while being interconnected; and
control the volume level for the function of the electronic device corresponding to an output volume value of the content output at the controlled volume level for a specified time.

13. The electronic device of claim 12, wherein the output volume value of the content includes:
an equivalent sound level value of the content output at the controlled volume level for the specified time.

14. The electronic device of claim 11, wherein the at least one memory stores at least one instruction that, when executed, causes the at least one processor to:
control the volume level for the content and the volume level for the function of the electronic device while interconnecting the volume level for the content and the volume level for the function of the electronic device based on a sound output type for the function of the electronic device when the volume level for the content and the volume level for the function of the electronic device are controlled while being interconnected.

15. The electronic device of claim 14, wherein the sound output type for the function includes:
at least one of a type of pausing a sound for the content and outputting a sound for the function, a type of reducing the sound for the content and outputting the sound for the function, and a type of outputting the sound for the function while maintaining the sound for the content.

* * * * *